United States Patent
Uehara (10) Patent No.: US 8,252,476 B2
(45) Date of Patent: Aug. 28, 2012

(54) MEMBRANE ELECTRODE ASSEMBLY, MANUFACTURING METHOD THEREOF AND FUEL CELL

(75) Inventor: Naoko Uehara, Tokyo (JP)

(73) Assignee: Toppan Printing Co., Ltd. (JP)

( * ) Notice: Subject to any disclaimer, the term of this patent is extended or adjusted under 35 U.S.C. 154(b) by 325 days.

(21) Appl. No.: 12/565,511

(22) Filed: Sep. 23, 2009

(65) Prior Publication Data

US 2010/0075190 A1 Mar. 25, 2010

(30) Foreign Application Priority Data

Sep. 24, 2008 (JP) ................................. 2008-243821

(51) Int. Cl.
*H01M 8/10* (2006.01)
*H01M 4/86* (2006.01)
(52) U.S. Cl. ........................................................ 429/483
(58) Field of Classification Search ................... 429/483
See application file for complete search history.

(56) References Cited

U.S. PATENT DOCUMENTS

| | | | |
|---|---|---|---|
| 2003/0031916 A1* | 2/2003 | Haridoss et al. | 429/40 |
| 2004/0185325 A1* | 9/2004 | Faguy et al. | 429/44 |
| 2005/0008926 A1* | 1/2005 | Yamamoto | 429/41 |
| 2005/0202308 A1* | 9/2005 | Takahashi et al. | 429/44 |

FOREIGN PATENT DOCUMENTS

| | | |
|---|---|---|
| JP | 2004-158387 | 6/2004 |
| JP | 2008-041406 | 2/2008 |

* cited by examiner

*Primary Examiner* — Gregg Cantelmo
(74) *Attorney, Agent, or Firm* — Squire Sanders (US) LLP (57) ABSTRACT

The present invention prevents a flooding phenomenon by a simple method and receives a relatively small influence by a proton transfer in the catalyst layer so as to provide an MEA having an excellent power generation performance. An MEA of the present invention has an anode catalyst layer and a cathode catalyst layer on surfaces of the polymer electrolyte membrane and catalyst loaded particles are included in the anode catalyst layer and the cathode catalyst layer. It is a feature of the present invention that the cathode catalyst layer has more catalysts in a surface region than in a boundary region with the polymer electrolyte membrane in the thickness direction, whereas the anode catalyst layer has more catalysts in a boundary region than in a surface region in the thickness direction.

5 Claims, 4 Drawing Sheets

MEMBRANE ELECTRODE ASSEMBLY, MANUFACTURING METHOD THEREOF AND FUEL CELL

CROSS REFERENCE TO RELATED APPLICATION

This application is based on and claims the benefit of priority from the Japanese Patent Application number 2008-243821, filed on Sep. 24, 2008, the entire contents of which are incorporated herein by reference.

BACKGROUND OF THE INVENTION

1. Field of the Invention

The present invention relates to a polymer electrolyte fuel cell (PEFC) for a vehicle, a household stationary power supply and a mobile device. Furthermore, the present invention relates to a membrane electrode assembly (MEA) used in such a PEFC.

2. Description of the Related Art

Fuel cells are power generation systems which produce electric power along with heat. A fuel gas including hydrogen and an oxidant gas including oxygen reacts together on electrodes containing a catalyst so that the reverse reaction of water electrolysis takes place in a fuel cell. Fuel cells are attracting attention as a clean energy source of the future since they have advantages such as a small impact on the environment and a low level of noise production relative to conventional power generation systems. Fuel cells are divided into several types according to the employed ion conductor. A fuel cell which uses an ion-conductive polymer membrane is called a polymer electrolyte fuel cell (PEFC).

Among various fuel cells, a PEFC, which can be used at around room temperature, is considered as a promising fuel cell for use in a vehicle and a household stationary power supply etc. and is being developed widely in recent years. A joint unit which has a pair of electrode layers on both sides of a polymer electrolyte and which is called a membrane electrode assembly (MEA) is arranged between a pair of separators, on each of which a gas flow path for either supplying a fuel gas including hydrogen to one of the electrodes or supplying an oxidant gas including oxygen to the other electrode is formed, in the PEFC. The electrode for supplying a fuel gas is called a fuel electrode, whereas the electrode for supplying an oxidant gas is called an air electrode. Each of the electrodes includes an electrode catalyst layer, which has stacked polymer electrolytes with carbon particles on which a catalyst such as a noble metal of platinum group is loaded, and a gas diffusion layer which has gas permeability and electron conductivity.

<Patent document 1> JP-A-2004-158387
<Patent document 2> JP-A-2008-041406

In a PEFC, a fuel gas including hydrogen is supplied to the anode electrode and an oxidant gas including oxygen is supplied to the cathode so that an electromotive force is generated. The following reactions occur on the anode electrode catalyst layer and the cathode electrode catalyst layer.

On the anode: $H_2 \rightarrow 2H^+ + 2e^-$

On the cathode: $(1/2)O_2 + 2H^+ + 2e^- \rightarrow +H_2O$

At this time, the protons generated on the anode are transferred to the cathode via the polymer electrolyte membrane while the electrons move via the external circuitry.

Water is produced in the cathode catalyst layer. This reaction occurs since catalysts are at a three-phase interface. The three-phase interface is an interface in which three phases, namely, pores through which materials are transferred (a path for gases), the polymer electrolyte membrane which conducts ions (a path for protons), and the catalyst loaded particles which conduct electrons (a path for electrons) are involved. There is a problem in a fuel cell that the power generation performance decreases due to a flooding phenomenon, which occurs in such a way that the water produced by the reaction fills in the three-phase interface and disturbs the power generation reaction. The influence of the flooding phenomenon is particularly serious in the case where the fuel cell operates at a high current density and thus a large amount of water is produced.

In addition, there is another problem concerning the protons generated in the anode electrode catalyst layer. Since the protons must be ultimately transferred to the cathode via the polymer electrolyte membrane from the anode catalyst layer, resistance by the anode catalyst layer to the proton transfer causes a problem of a decrease in the battery performance.

SUMMARY OF THE INVENTION

According to the manufacturing method of an MEA of the present invention the flooding phenomenon and the decrease in battery performance relating to the proton transfer are prevented by a simple method. Thus, the present invention provides an MEA having an excellent power generation performance along with a fuel cell using such an MEA.

In order to solve problems described above, a first aspect of the present invention is an MEA which has a polymer electrolyte membrane, an anode catalyst layer, and a cathode catalyst layer, the anode catalyst layer being arranged on one surface of the polymer electrolyte membrane, the cathode catalyst layer being arranged on the other surface of the polymer electrolyte membrane, the anode catalyst layer and said cathode catalyst layer including catalyst loaded particles and a polymer electrolyte, said cathode catalyst layer having a higher catalyst concentration in the surface region than in the boundary region with the polymer electrolyte membrane when measured in the thickness direction of said cathode catalyst layer, and the anode catalyst layer having a higher catalyst concentration in the boundary region with said polymer electrolyte membrane than in the surface region when measured in the thickness direction of said anode catalyst layer.

A second aspect of the present invention is the MEA according to the first aspect of the present invention, wherein a greater unit amount of catalyst is loaded in a unit amount of the catalyst loaded particles in the surface region of the cathode catalyst layer than in a unit amount of the catalyst loaded particles in the boundary region with the polymer electrolyte membrane in the cathode catalyst layer when observed in the thickness direction of the cathode catalyst layer, and a greater amount of catalyst is loaded in a unit amount of the catalyst loaded particles in the boundary region with the polymer electrolyte membrane in the anode catalyst layer than in a unit amount of the catalyst loaded particles in the surface region of the anode catalyst layer when observed in the thickness direction of the anode catalyst layer.

A third aspect of the present invention is a fuel cell which has the MEA according to the first aspect of the present invention, a pair of gas diffusion layers, and a pair of separators, the MEA according to the first aspect of the present invention being interposed between the pair of gas diffusion layers, and the MEA according to the first aspect of the present invention interposed between the pair of gas diffusion layers being further interposed between the pair of separators.

A fourth aspect of the present invention is a manufacturing method of an MEA which includes preparing at least two catalyst inks each of which includes catalyst loaded particles, a polymer electrolyte and a solvent and which have different catalyst concentrations, coating each of the at least two catalyst inks on a first substrate and drying the coated catalyst inks to form at least two catalyst sublayers of a cathode catalyst layer and coating each of the at least two catalyst inks on a second substrate and drying the coated catalyst inks to form at least two catalyst sublayers of an anode catalyst layer, forming the at least two catalyst sublayers of the cathode catalyst layer on the first substrate in order of decreasing catalyst concentration (from the first substrate side) to obtain a transfer sheet for the cathode catalyst layer, forming the at least two catalyst sublayers of the anode catalyst layer on the second substrate in order of increasing catalyst concentration (from the second substrate side) to obtain a transfer sheet for the anode catalyst layer, arranging the transfer sheet for the cathode catalyst layer and the transfer sheet for the anode catalyst layer on both surfaces of a polymer electrolyte membrane, and joining the cathode catalyst layer and the anode catalyst layer to the polymer electrolyte membrane to obtain the MEA.

A fifth aspect of the present invention is the manufacturing method according to the fourth aspect of the present invention, wherein the at least two catalyst inks which have different catalyst concentrations are at least two catalyst inks which include different amounts of catalyst in a unit amount of the catalyst loaded particles, and the transfer sheet for the cathode catalyst layer has a stack structure of the catalyst sublayers arranged in order of a decreasing amount of catalyst in a unit amount of the catalyst loaded particles from the first substrate side and the transfer sheet for the anode catalyst layer has stacked a stack structure of the catalyst sublayers arranged in order of an increasing amount of catalyst in a unit amount of the catalyst loaded particles from the second substrate side.

A sixth aspect of the present invention is an MEA which is made by the manufacturing method according to the fourth aspect of the present invention.

A seventh aspect of the present invention is a fuel cell which has the MEA according to the sixth aspect of the present invention, a pair of gas diffusion layers, and a pair of separators, the MEA being arranged between the pair of gas diffusion layers, and the pair of gas diffusion layers, between which the MEA is interposed, being further arranged between the pair of separators.

According to the manufacturing method of the present invention, an MEA having only a small decrease in battery performance caused by the flooding phenomenon and the insufficient proton transfer in the electrode (particularly anode) catalyst layer is obtained. Thereby a fuel gas which has an excellent battery performance can be obtained.

DESCRIPTION OF REFERENCE NUMERALS AND SIGNS

1: Polymer electrolyte membrane.
2: Anode (electrode) catalyst layer. 3: Cathode (electrode) catalyst layer.
12: Membrane electrode assembly (MEA).
2a: Catalyst rich region of anode catalyst layer (Anode catalyst sublayer with higher catalyst concentration or Anode catalyst sublayer with a large amount of catalysts).
2b: Catalyst poor region of anode catalyst layer (Anode catalyst sublayer with lower catalyst concentration or Anode catalyst sublayer with a small amount of catalysts).
3a: Catalyst rich region of cathode catalyst layer (Cathode catalyst sublayer with higher catalyst concentration or Cathode catalyst sublayer with a large amount of catalyst).
3b: Catalyst poor region of cathode catalyst layer (Cathode catalyst sublayer with lower catalyst concentration or Cathode catalyst sublayer with a small amount of catalyst).
13: Substrate.
2a': Catalyst ink with higher catalyst concentration (Catalyst ink with a large amount of catalysts).
2b': Catalyst ink with lower catalyst concentration (Catalyst ink with a small amount of catalysts).
3a': Catalyst ink with higher catalyst concentration (Catalyst ink with a large amount of catalysts).
3b': Catalyst ink with lower catalyst concentration (Catalyst ink with a small amount of catalysts).
14: Transfer sheet for anode catalyst layer.
15: Transfer sheet for cathode catalyst layer.
4: Gas diffusion layer (in anode electrode).
5: Gas diffusion layer (in cathode electrode).
6: Anode (electrode) or Fuel electrode. 7: Cathode (electrode) or Oxidant electrode.
8: Gas flow path. 9: Cooling water path. 10: Separator.

DETAILED DESCRIPTION OF THE INVENTION

An MEA of the present invention is described below.

Figure 1:
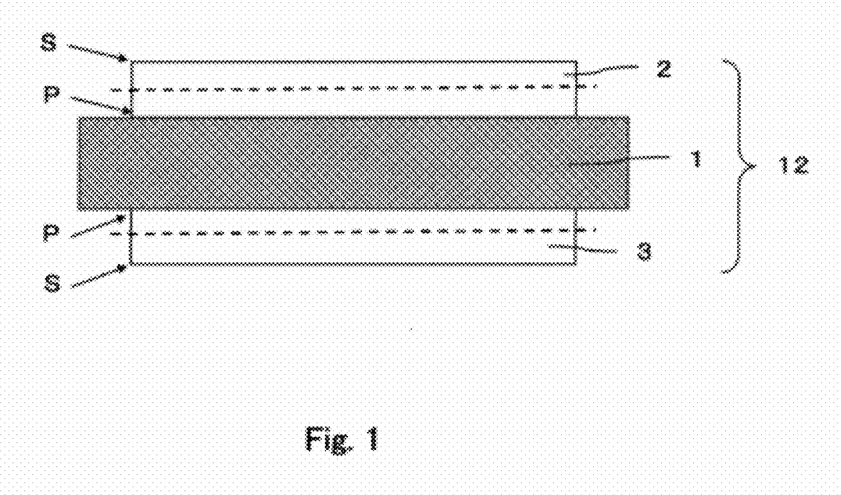
FIG. 1 is an exemplary cross sectional view of an MEA of the present invention.

FIG. 1 is an exemplary cross sectional view of an MEA of the present invention. An MEA of the present invention has an electrode catalyst layer (anode catalyst layer 2) on one surface of a polymer electrolyte membrane 1 and another electrode catalyst layer (cathode catalyst layer 3) on the other surface of the polymer electrolyte membrane 1. Each of the electrode catalyst layers 2 and 3 includes catalyst loaded particles, on which catalysts are loaded, and a polymer electrolyte. It is a feature of the present invention that the cathode catalyst layer 3 has such a catalyst concentration profile in the thickness direction that more catalysts are distributed in the surface region S than in the boundary region P with the polymer electrolyte membrane. In addition, it is a feature of the present invention that the anode catalyst layer 2 has such a catalyst concentration profile in the thickness direction that fewer catalysts are distributed in the surface region S than in the boundary region P with the polymer electrolyte membrane.

Since the cathode catalyst layer 3 has a higher catalyst concentration in the surface region S than in the boundary region P with the polymer electrolyte membrane in the thickness direction, the reaction of the cathode occurs more actively in the surface region S in MEA of the present invention, thereby easily eliminating water produced by the reaction from the reaction system. In other words, by distributing more catalysts in the region S near the surface than in the region P near the boundary with the polymer electrolyte membrane 1 in the layer thickness direction, it is possible to improve the drainage property of the cathode catalyst layer and prevent a decrease in battery performance caused by the flooding phenomenon so that an MEA with an excellent battery performance is obtained. Water which is produced in the cathode layer 3 in the region P near the boundary with the polymer electrolyte membrane 1 is difficult to eject from the layer because it has to pass all the way through in the cathode layer 3 in the thickness direction.

In addition, since the anode catalyst layer 2 has a higher catalyst concentration in the boundary region P with the polymer electrolyte membrane than in the surface region S in the thickness direction, the reaction of the anode occurs more actively in the surface region S in the MEA of the present invention. Thus, more protons are produced near the boundary with the polymer electrolyte membrane 1 and it is possible to reduce a distance of the proton transfer in the anode catalyst layer 2, thereby weakening the influence of a decrease in the battery performance by the proton transfer. In other words, by distributing more catalysts in the region P near the boundary with the polymer electrolyte membrane 1 than in the region S near the surface in the layer thickness direction, it is possible to reduce proton transfers in the anode catalyst layer 2 and prevent a decrease in battery performance caused by the proton transfers so that an MEA with an excellent battery performance is obtained.

In addition, it is possible in the MEA of the present invention to efficiently use the catalyst and reduce the total amount of catalyst usage by varying catalyst concentrations in the anode catalyst layer and the cathode catalyst layer according to the position in the thickness direction.

It is noted in the present invention that a description "the cathode catalyst layer 3 has such a catalyst concentration profile in the thickness direction that more catalysts are distributed in the surface region S than in the boundary region P with the polymer electrolyte membrane" means such a state that, for example, when the cathode catalyst layer 3 is divided into two layers having the same volumes by slicing the layer at the middle point in the thickness direction, a part which includes the surface region S contains more catalysts than the other part which includes the boundary region P. Similarly, a description "the anode catalyst layer 2 has such a catalyst concentration profile in the thickness direction that fewer catalysts are distributed in the surface region S than in the boundary region P with the polymer electrolyte membrane" means such a state that, for example, when the anode catalyst layer 2 is divided into two layers having the same volumes by slicing the layer at the middle point in the thickness direction, a part which includes the surface region S contains less catalysts than the other part which includes the boundary region P.

In addition, catalyst loaded particles on which various amounts of catalyst are loaded per unit amount of catalyst loaded particles are preferably used in the present invention for the purpose of varying catalyst concentrations in the thickness direction of the anode catalyst layer and the cathode catalyst layer. In other words, it is preferable in the present invention that a unit amount of the catalyst loaded particles in the surface region are loaded with a greater amount of catalyst than those in the boundary region with the polymer electrolyte membrane when measured in the cathode thickness direction, and a unit amount of the catalyst loaded particles in the boundary region with the polymer electrolyte membrane are loaded with a greater amount of catalyst than those in the surface region when measured in the anode thickness direction. The effect of the present invention is achieved efficiently by using catalyst loaded particles on which various amounts of catalyst are loaded in order to vary catalyst concentrations in the thickness direction of the anode catalyst layer and the cathode catalyst layer.

For example, in the case where the catalyst concentration variation in the thickness direction of the anode catalyst layer and the cathode catalyst layer of the present invention is provided by using only catalyst loaded particles on which the same amounts of catalyst are loaded per unit amount of the catalyst loaded particles and varying a blend ratio of the catalyst loaded particles to the polymer electrolyte membrane according to the position in the thickness direction, electron transfer tends to be difficult in a region where this blend ratio of the catalyst loaded particles is small whereas proton transfer tends to be difficult in a region where this blend ratio of the catalyst loaded particles is large. In such a case, the resultant MEA may have an insufficient power generation performance. Hence, it is preferred in the present invention that catalyst concentration variation in the thickness direction of the anode catalyst layer and the cathode catalyst layer is provided by using catalyst loaded particles on which different amounts of catalysts are loaded in a unit amount of the catalyst loaded particles.

Figure 2:
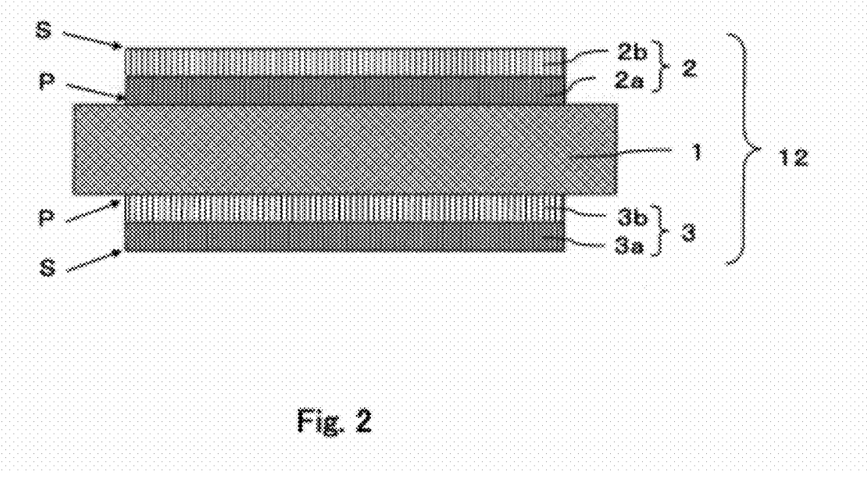
FIG. 2 is an exemplary cross sectional view of another embodiment of an MEA of the present invention.

FIG. 2 shows another embodiment of an MEA of the present invention. An MEA of the present invention is formed by arranging the anode catalyst layer on one surface of the polymer electrolyte membrane and the cathode catalyst layer on the other surface of the polymer electrolyte membrane using a catalyst ink which contains catalyst loaded particles, a polymer electrolyte and a solvent. At this point, an anode catalyst layer and a cathode catalyst layer with a multilayer structure can be formed by coating a plurality of catalyst inks each of which has a different catalyst concentration, and thereby making the anode catalyst layer and the cathode catalyst layer have a catalyst concentration variation in the thickness direction.

The cathode catalyst layer 3 in the MEA of FIG. 2 has a cathode catalyst sublayer 3b with a lower catalyst concentration and another cathode catalyst sublayer 3a with a higher catalyst concentration from the polymer electrolyte membrane 1 boundary side. On the other hand, the anode catalyst layer 2 has an anode catalyst sublayer 2a with a higher catalyst concentration and another anode catalyst sublayer 2b with a lower catalyst concentration from the polymer electrolyte membrane 1 boundary side. It is noted that it is not necessary to limit the multilayer structure of the anode catalyst layer 2 and the cathode catalyst layer 3 to a double layer structure.

Next, a method for manufacturing an MEA of the present invention is described.

Two or more catalyst inks which contain catalyst loaded particles, a polymer electrolyte and a solvent and have different catalyst concentrations are prepared. The catalyst inks which differ in catalyst concentration are sequentially coated on a substrate and dried so that a transfer sheet in which a cathode catalyst layer of a catalyst layer with a large catalyst amount and a catalyst layer with a small catalyst amount stacked in this order from the substrate side is formed as well as a transfer sheet in which an anode catalyst layer of a catalyst layer with a small catalyst amount and a catalyst layer with a large catalyst amount stacked in this order from the substrate side is formed. The two transfer sheets are arranged on both sides of a polymer electrolyte membrane and combined together with the polymer electrolyte membrane to make an MEA. At this time, it is preferred to use a plurality of catalyst inks which have different catalyst amounts in unit amounts of catalyst loaded particles as the catalyst inks which differ in catalyst concentration.

Figure 3:
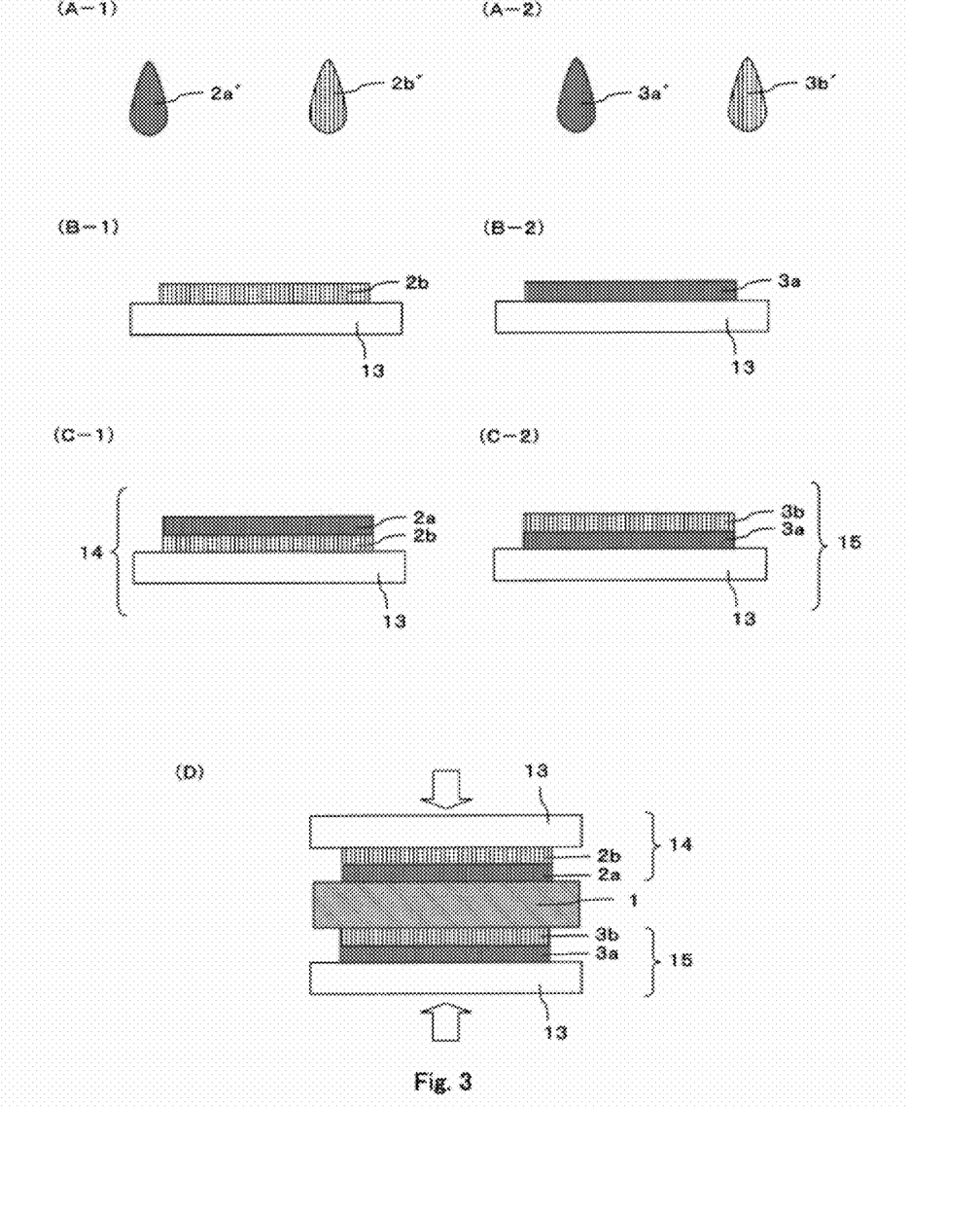
FIG. 3 is an explanatory diagram of a manufacturing method of an MEA of the present invention.

FIG. 3 is an explanatory diagram of a manufacturing method of an MEA of the present invention. First, catalyst inks with a high catalyst concentration 2a' and 3a' which contain catalyst loaded particles, a polymer electrolyte and a solvent and catalyst inks with a low catalyst concentration 2b' and 3b' which similarly contain catalyst loaded particles, a polymer electrolyte and a solvent are prepared (see FIG. 3 (A-1) and (A-2)).

Two substrates 13 are prepared. The catalyst ink with a low catalyst concentration 2b' is coated on one of the substrates 13 followed by removing the solvent to form an anode catalyst layer with a low catalyst concentration 2b (see FIG. 3 (B-1)). Then, the catalyst ink with a high catalyst concentration 2a' is further coated on the anode catalyst layer with a low catalyst concentration 2b followed by removing the solvent to form an anode catalyst layer with a high catalyst concentration 2a and a transfer sheet for the anode catalyst layer 14 is obtained (see FIG. 3 (C-1)).

The catalyst ink with a high catalyst concentration 3a' is coated on the other substrate 13 followed by removing the solvent to form a cathode catalyst layer with a high catalyst concentration 3a (see FIG. 3 (B-2)). Then, the catalyst ink with a low catalyst concentration 3b' is further coated on the cathode catalyst layer with a high catalyst concentration 3a followed by removing the solvent to form a cathode catalyst layer with a low catalyst concentration 3b and a transfer sheet for the cathode catalyst layer 15 is obtained (see FIG. 3 (C-2)).

A polymer electrolyte membrane 1 is arranged between the resultant transfer sheet for the anode catalyst layer 14 and the transfer sheet for the cathode catalyst layer 15. The anode catalyst layer 14 and the cathode catalyst layer 15 are combined with the polymer electrolyte membrane 1 by a hot press to make an MEA 12. Afterwards, the substrates 13 are peeled off and removed if necessary. In this way, an MEA of the present invention is manufactured.

In addition, an MEA of the present invention can also be manufactured without using the substrates in such a way that catalyst inks with different catalyst concentrations are coated directly on the polymer electrolyte membrane followed by drying to make an anode catalyst layer and a cathode catalyst layer of stacked structures on the polymer electrolyte membrane 1.

Next, a fuel cell of the present invention is described.

Figure 4:
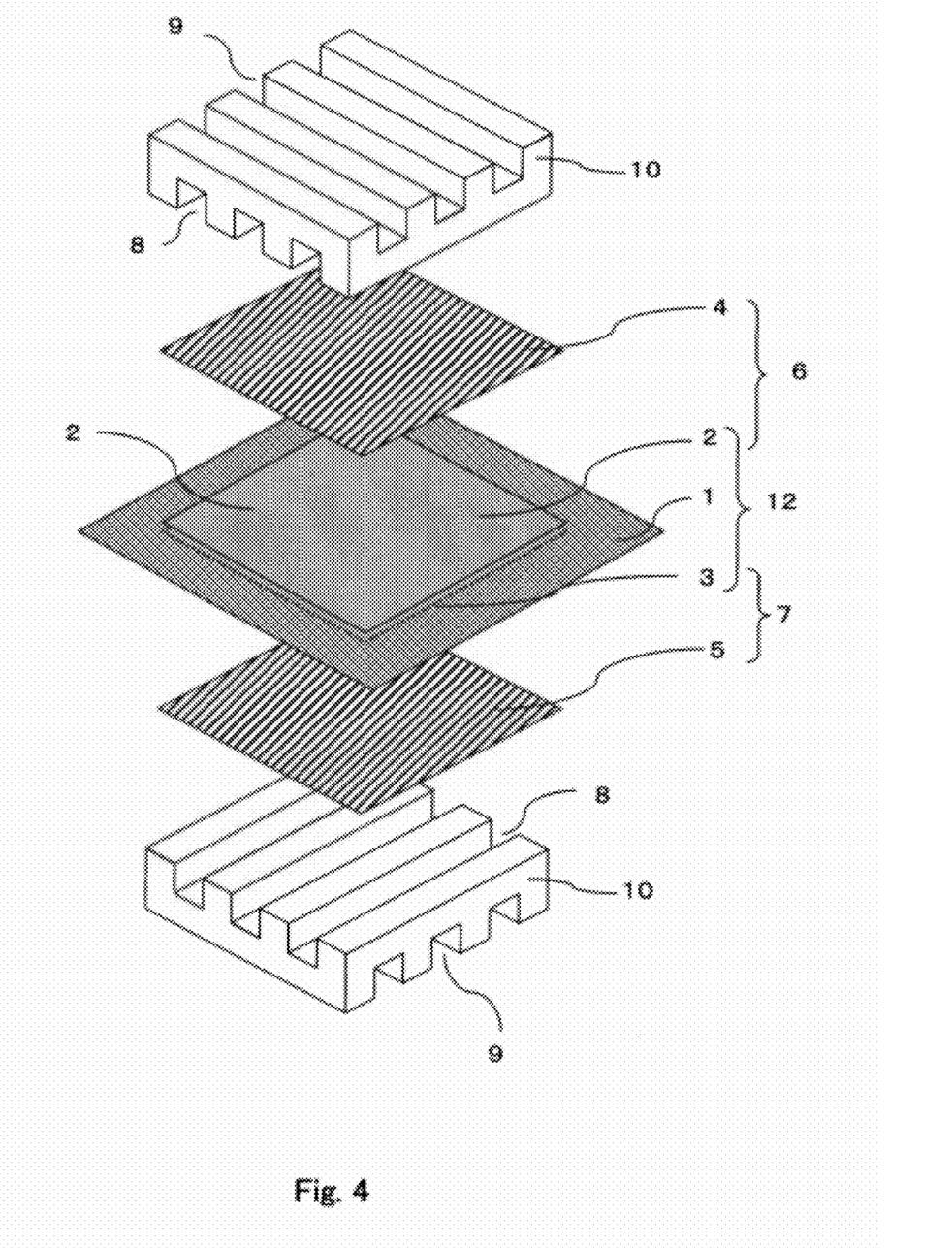
FIG. 4 is an exploded exemplary diagram of a fuel cell of the present invention.

FIG. 4 illustrates an exploded exemplary diagram of a fuel cell of the present invention. A gas diffusion layer on the anode 4 and a gas diffusion layer on the cathode 5 are arranged facing the anode catalyst layer 2 and the cathode catalyst layer 3 on the MEA 12, thereby forming an anode electrode 6 and a cathode electrode 7, respectively. Then, a pair of separators 10 each of which includes a gas flow path 8 on the surface and a cooling water path 9 on the other surface and is made of a conductive and impermeable material is further arranged. A fuel gas, for example, hydrogen gas is supplied through the gas flow path 8 of the separator 10 on the anode electrode 7. Whereas an oxidant gas, for example, a gas containing oxygen is supplied through the gas flow path 8 of the separator 10 on the cathode electrode 6. Then, the hydrogen as the fuel gas reacts with oxygen gas under the presence of catalysts on the electrodes, and an electromotive force is generated between the electrodes of anode and cathode.

The fuel cell illustrated in FIG. 4 belongs to the so-called single cell type of polymer electrolyte fuel cells, in which the polymer electrolyte membrane 1 together with electrode catalyst layers 2 and 3 and gas diffusion layers 4 and 5 are interposed between a pair of separators. It is noted, however, that a fuel cell of the present invention is not limited to the single cell type, and can be applied to a fuel cell in which a plurality of cells are stacked via the separators 10.

An MEA and a fuel cell of the present invention are described further in detail.

Since polymer electrolytes having proton conductivity can be used as the polymer electrolyte membrane of MEA of the present invention, certain types of fluoropolymer electrolytes and hydrocarbon polymer electrolytes can be used as the polymer electrolyte membrane of MEA and PEFC. For example, NAFION® made by DuPont, FLEMION® made by Asahi Glass Co., Ltd., ACIPLEX® made by Asahi Kasei Corp., and GORE SELECT® made by W. L. Gore & Associates, Inc. etc. are available as the fluoropolymer electrolytes. Electrolyte membranes of sulfonated polyetherketone (PEK), sulfonated polyethersulfone (PES), sulfonated poly(ether ether sulfone) (PEES), sulfonated polysulfide and sulfonated polyphenylene etc. are available as the hydrocarbon polymer electrolytes. Above all, NAFION® series materials made by DuPont are preferable.

The electrode catalyst layers (anode catalyst layer and cathode catalyst layer) formed on both surfaces of the polymer electrolyte membrane of an MEA of the present invention are formed by coating catalyst inks on transfer sheets to form electrode catalyst layers on the transfer sheets, followed by hot pressing the transfer sheets having the electrode catalyst layers on both sides of the polymer electrolyte membrane. Each of the catalyst inks contains at least a polymer electrolyte and catalyst loaded carbons.

Since proton conductive polymer electrolytes can be used as the polymer electrolyte contained in the catalyst ink, similar electrolytes to those suitable for the polymer electrolyte membrane can also be used in the catalyst ink. In other words, certain types of fluoropolymer electrolytes and hydrocarbon polymer electrolytes can be used. For example, NAFION® made by DuPont etc. are available as the fluoropolymer electrolytes. Electrolyte membranes of sulfonated polyetherketone (PEK), sulfonated polyethersulfone (PES), sulfonated poly(ether ether sulfone) (PEES), sulfonated polysulfide and sulfonated polyphenylene etc. are available as the hydrocarbon polymer electrolytes. Above all, NAFION® series materials made by DuPont are preferable. Considering the adhesions between the electrode (anode and cathode) catalyst layers and the polymer electrolyte membrane, it is preferred to use the same material in the catalyst ink as that is used as the polymer electrolyte membrane.

Metals of platinum group such as platinum, palladium, ruthenium, iridium, rhodium and osmium, and other metals such as iron, tin, copper, cobalt, nickel, manganese, vanadium, molybdenum, gallium and aluminum etc. as well as alloys, oxides and multiple oxides of these metals can be used as the catalyst in the catalyst loaded particles of the present invention.

In addition, the catalyst is preferred to have a particle size in the range of 0.5-20 nm in diameter because the catalyst activity weakens if the particle is too large whereas the stability decreases if the particle is too small. The particle size in the range of 1-5 nm is more preferable. Catalyst particles of any one or more of platinum, gold, palladium, rhodium, ruthenium and iridium are preferably used in the present invention since they have excellent electrode reactivity and promote efficient and stable electrode reaction so that the resultant PEFC has a high level of power generation performance.

Carbon particles are temporarily used as conductive powder on which the catalyst particles are loaded. Any type of carbon can be used as long as it has a particle shape and electrical conductivity along with chemical resistance to the catalyst. For example, carbon black, graphite, active carbon, carbon fiber, carbon nanotube and fullerene can be used. It becomes difficult to form electron conduction paths if the carbon particle size is too small, whereas gas diffusion becomes poor and catalyst efficiency decreases if the carbon particle size is too large. Thus, it is preferable that the carbon size is in the range of about 10-1000 nm in diameter. In the range of 10-100 nm is more preferable.

There is no particular limitation to the solvent used as a dispersant of the catalyst ink as long as the solvent never chemically reacts with the catalyst particles and the polymer electrolyte and is able to disperse the polymer electrolyte as a micro gel or dissolve the polymer electrolyte in a highly fluid state.

It is, however, preferable in the solvent that at least one of a volatile organic solvent is contained although it is not necessary. Usually alcohols such as methanol, ethanol, 1-propanol, 2-propanol, 1-butanol, 2-butanol, isobutyl alcohol, t-butyl alcohol and pentanol etc., ketone solvents such as acetone, methyl ethyl ketone, pentanone, methyl isobutyl ketone, heptanone, cyclohexanone, methyl cyclohexanone, acetonylacetone and diisobutyl ketone etc., ether solvents such as tetrahydrofuran, dioxane, diethylene glycol dimethyl ether, anisole, methoxytoluene and dibutyl ether etc., other polar solvents such as dimethylformamide, dimethylacetoamide, N-methylpyrrolidone, ethylene glycol, diethylene glycol, diacetone alcohol and 1-methoxy-2-propanol etc. are used. In addition, solvent mixtures of any combination of these can also be used.

In addition, a mixture with water is preferred to be used in the case where a lower alcohol solvent is used since lower alcohols involve a danger of ignition. Water may be included if the polymer electrolyte blends well together with water. There is no limitation to the amount of added water as long as the polymer electrolyte is not turned into a gel (gelated) nor separated from the solvent to become clouded.

The catalyst ink may include a dispersant in order to disperse catalyst loaded carbon particles. An anion surfactant, a cation surfactant, a zwitterionic surfactant and a nonionic water soluble surfactant etc. are available as the dispersant.

Specifically, for example, carboxylate type surfactants such as alkyl ether carbonates, ether carbonates, alkanoyl sarcosine, alkanoyl glutaninates, acyl glutaninates, oleic acid N-methyltaurine, potassium oleate diethanolamine salts, alkyl ether sulfate triethanolamine salts, polyoxyethylene alkyl ether sulfate triethanolamine salts, amine salts of specialty modified polyether ester acids, amine salts of higher fatty acid derivatives, amine salts of specialty modified polyester acids, amine salts of large molecular weight polyether ester acids, amine salts of specialty modified phosphate esters, amideamine salts of large molecular weight polyether ester acids, amide-amine salts of specialty aliphatic acid derivatives, alkylamine salts of higher fatty acids, amideamine salts of large molecular weight polycarboxylic acids, sodium laurate, and sodium stearate, sodium oleate etc., sulfonate type surfactants such as dialkylsulfosuccinates, salts of 1,2-bis(alkoxycarbonyl)-1-ethanesulfonic acid, alkylsulfonates, paraffin sulfonates, alpha-olefin sulfonates, linear alkylbenzene sulfonates, alkylbenzene sulfonates, polynaphthylmethane sulfonates, naphthalenesulfonate-formaline condensates, alkylnaphthalene sulfonates, alkanoylmethyl taurides, sodium salt of lauryl sulfate ester, sodium salt of cetyl sulfate ester, sodium salt of stearyl sulfate ester, sodium salt of oleyl sulfate ester, lauryl ether sulfate ester salt, sodium alkylbenzene sulfonates, and oil-soluble alkylbenzene sulfonates etc., sulfate ester type surfactants such as alkylsulfate ester salts, alkyl sulphates, alkyl ether sulphates, polyoxyethylene alkyl ether sulfates, alkyl polyethoxy sulfates, polyglycol ether sulfates, alkyl polyoxyethylene sulfates, sulfonate oil, and highly sulfonated oil etc., phosphate ester type surfactants such as monoalkyl phosphates, dialkyl phosphates, monoalkyl phosphate esters, dialkyl phosphate esters, alkyl polyoxyethylene phosphates, alkyl ether phosphates, alkyl polyethoxy phosphates, polyoxyethylene alkyl ethers, alkylphenyl polyoxyethylene phosphate, alkylphenyl ether phosphates, alkylphenyl polyethoxy phosphates, polyoxyethylene alkylphenylether phosphates, disodium salts of higher alcohol phosphate monoester, disodium salts of higher alcohol phosphate diester, and zinc dialkyl dithiophosphate etc. can be used as the anion surfactant mentioned above.

For example, benzyldimethyl[2-{2-(p-1,1,3,3-tetramethylbutylphenoxy) ethoxy}ethyl]ammonium chloride, octadecylamine acetate, tetradecylamine acetate, octadecyltrimethylammonium chloride, beef tallow trimethylammonium chloride, dodecyltrimethylammonium chloride, palm trimethylammonium chloride, hexadecyltrimethylammonium chloride, behenyltrimethylammonium chloride, palm dimethylbenzylammonium chloride, tetradecyldimethylbenzylammonium chloride, octadecyldimethylbenzylammonium chloride, dioleyldimethylammonium chloride, 1-hydroxyethyl-2-beef tallow imidazoline quaternary salt, 2-heptadecenyl-hydroxyethyl imidazoline, stearamideethyldiethylamine acetate, stearamideethyldiethylamine hydrochloride, triethanolamine monostearate formate, alkylpyridium salts, higher alkylamine-ethylene oxide adducts, polyacrylamide amine salts, modified polyacrylamide amine salts, and perfluoroalkyl quaternary ammonium iodide etc. can be used as the cation surfactant stated above.

For example, dimethyl cocobetaine, dimethyl lauryl betaine, sodium laurylaminoethyl glycine, sodium laurylaminopropionate, stearyl dimethyl betaine, lauryl dihydroxyethyl betaine, amide betaine, imidazolinium betaine, lecithin, sodium 3-(ω-fluoroalkanoyl-N-ethylamino)-1-propane sulfonate, and N-{3-(perfluorooctanesulfoneamide) propyl}-N, N-dimethyl-N-carboxymethylene ammonium betaine etc. can be used as the zwitterionic surfactant mentioned above.

For example, coconut fatty acid diethanolamide (1:2 type), coconut fatty acid diethanolamide (1:1 type), beef tallowate diethanolamide (1:2 type), beef tallowate diethanolamide (1:1 type), oleic acid diethanolamide (1:1 type), hydroxyethyl laurylamine, polyethylene glycol laurylamine, polyethylene glycol cocoamine, polyethylene glycol stearylamine, polyethylene glycol beef tallow amine, polyethylene glycol beef tallow propylenediamine, polyethylene glycol dioleylamine, dimethyllaurylamine oxide, dimethylstearylamine oxide, dihydroxyethyllaurylamine oxide, perfluoroalkylamine oxides, polyvinylpyrrolidone, higher alcohol-ethylene oxide adducts, alkyl phenol-ethylene oxide adducts, fatty acid-ethylene oxide adducts, propylene glycol-ethylene oxide adduct, fatty acid esters of glycerin, fatty acid esters of pentaerythritol, fatty acid esters of sorbitol, fatty acid esters of sorbitan, and fatty acid esters of sugar etc. can be used as the nonionic surfactant mentioned above.

Among these surfactants above, sulfonate type surfactants such as alkylbenzene sulfonic acids, α-olefin sulfonic acids, sodium alkylbenzene sulfonates, oil soluble alkylbenzene sulfonates, and α-olefin sulfonates are preferable considering the dispersion performance of the dispersing agent and the influences of the residual dispersing agent on the catalyst efficiency etc.

The catalyst ink receives dispersion treatment if necessary. It is possible to control the particles size and the catalyst ink viscosity by the dispersion treatment conditions. The dispersion treatment can be performed with various types of equipment. The dispersion treatment may include, for example, a treatment by a ball mill, a roll mill, a shear mill, or a wet mill and an ultrasonic dispersion treatment etc. In addition, it may also include a treatment by a homogenizer, in which stirring using a centrifugal force is performed.

The amount of the solid content in the catalyst ink is preferred to be in the range of 1-50% by weight. In the case where the amount of the solid content is too large, cracks easily tend to occur on the surface of the resultant electrode catalyst layer (cathode catalyst layer or anode catalyst layer) since the viscosity of the catalyst ink becomes too high. On the other hand, in the case where the amount of the solid content is too small, the forming rate of the catalyst layer becomes too low to retain appropriate productivity. The solid content mainly includes two components, that is, the carbon particles (catalyst loaded carbon particles) and the polymer electrolyte. The more the catalyst loaded carbon particles are included, the higher the viscosity of the ink becomes even when the total amount of the solid content is unchanged. If the amount of carbon particles decreases, the viscosity also falls accordingly.

Thus, it is preferable that the ratio of the catalyst loaded particles to the total solid content is adjusted within the range of 10-80% by weight. In addition, the catalyst ink viscosity at this time is preferably about 0.1-500 cP (more preferably about 5-100 cP). Moreover, the viscosity can also be controlled by an addition of a dispersing agent when dispersing the catalyst ink.

In addition, the catalyst ink may include a pore forming agent. Fine pores are created by removing this agent after the electrode catalyst is formed. Examples of the pore forming agent are materials soluble to acid, alkali or water, sublimation materials such as camphor, and materials which decompose by heat. If the pore former is soluble in warm water, it may be removed by water produced during the power generation.

Inorganic salts (soluble to acid) such as calcium carbonate, barium carbonate, magnesium carbonate, magnesium sulfate, and magnesium oxide etc., inorganic salts (soluble to alkali aqueous solution) such as alumina, silica gel, and silica sol etc., metals (soluble to acid and/or alkali) such as aluminum, zinc, tin, nickel, and iron etc., inorganic salts (soluble to water) aqueous solutions of sodium chloride, potassium chloride, ammonium chloride, sodium carbonate, sodium sulfate, and monobasic sodium phosphate etc., and water soluble organic compounds such as polyvinyl alcohol, and polyethylene glycol etc. are available as the pore forming agent soluble in acid, alkali or water. Not only a single material of these but a plurality of these together can effectively be used.

The catalyst ink is coated on the substrate so that an electrode catalyst layer (each of the cathode catalyst layer and anode catalyst layer) is formed on the substrate. At this time, a doctor blade method, a dipping method, a screen printing method, a roll coating method and a spray method etc. can be used as the coating method. Among these, the spray method such as, for example, a pressure spray method, an ultrasonic spray method, and an electrostatic spray method etc. has an advantage that an agglutination of the catalyst loaded carbons hardly occurs when drying the coated catalyst ink so that an electrode catalyst layer which has evenly distributed high density pores is obtained. After coating on the transfer sheet, the catalyst ink is dried to remove the solvent if necessary and the electrode catalyst layer is formed.

A polymer film or a polymer sheet which has good transfer properties can be used as the substrate. For example, fluororesins such as ethylene tetrafluoroethylene copolymer (ETFE), tetrafluoroethylene hexafluoroethylene copolymer (FEP), tetrafluoroethylene perfluoroalkyl vinyl ether copolymer (PFA), and polytetrafluoroethylene (PTFE) etc. can be used. In addition, polymer sheets or polymer films such as polyimide, polyethylene terephthalate (PET), polyamide (nylon), polysulfone (PSF), polyethersulfone (PES), polyphenylene sulfide (PPS), polyether ether ketone (PEEK), polyetherimide (PEI), polyarylate (PAR), and polyethylene naphthalate (PEN) etc. can be used as the substrate. In the case where a polymer sheet or a polymer film is used as the substrate, it is possible to peel off and remove the substrate after an electrode catalyst layer is stuck to the polymer electrolyte membrane so as to make an MEA in which electrode catalyst layers are arranged on both sides of the polymer electrolyte membrane.

In addition, a gas diffusion layer can also be used as the substrate. In this case, the substrate which acts as the gas diffusion layer is not peeled off after an electrode catalyst layer is stuck to the polymer electrolyte membrane.

Materials having gas diffusion properties and electric conductivity can be used the gas diffusion layer. Specifically, a carbon cloth, a carbon paper and a porous carbon such as unwoven carbon fabric can be used as the gas diffusion layer.

In addition, in the case where the gas diffusion layer is used as the substrate, a filling (or sealing) layer may preliminarily be formed on the gas diffusion layer before the catalyst ink is coated. The filling (or sealing) layer is formed to prevent the catalyst ink from seeping into the gas diffusion layer. If the filling layer is preliminarily formed, the catalyst ink is accumulated on the filling layer and a three-phase interface is formed even when the amount of the catalyst ink is small. Such a filling layer can be formed by dispersing carbon particles in a fluororesin solution and sintering the solution at a temperature higher than the melting point of the fluororesin. Polytetrafluoroethylene (PTFE) etc. can be used as the fluororesin.

In addition, a carbon separator and a metal separator etc. can be used as the separator of the present invention. The separator may incorporate a gas diffusion layer. In the case where the separators or the electrode catalyst layers also perform the function of the gas diffusion layers, it is unnecessary to arrange any independent gas diffusion layers. A fuel cell can be fabricated by joining additional equipment such as gas supply equipment and cooling equipment etc. to an MEA having such components described above.

EXAMPLES

Example

<<Preparation of catalyst ink>>

Two types of catalyst inks were prepared as described below using two types of platinum loaded carbon having a different amount of platinum catalyst.

<Catalyst Ink 1>

A platinum loaded carbon catalyst (carrier: Ketjen) having 70% by weight of platinum and 20% by weight of polymer electrolyte solution NAFION®, made by DuPont) were mixed in a solvent mixture of water and ethanol. Then a dispersion treatment by a planetary ball mill was performed to obtain a catalyst ink 1. The relative composition ratio of platinum loaded carbon and polymer electrolyte was 2:1 by weight.

<Catalyst Ink 2>

A platinum loaded carbon catalyst (carrier: Ketjen) having 30% by weight of platinum and 20% by weight of polymer electrolyte solution NAFION®, made by DuPont) were mixed in a solvent mixture of water and ethanol. Then a dispersion treatment by a planetary ball mill was performed to obtain a catalyst ink 2. The relative composition ratio of platinum loaded carbon and polymer electrolyte was 2:1 by weight.

<<Production of transfer sheet>>

<Transfer sheet for anode catalyst layer>

The catalyst ink 2 was coated on a PTFE sheet as a substrate and dried in an oven at 80° C. for ten minutes to form an anode catalyst sublayer made from the catalyst ink 2. After the drying, the catalyst ink 1 was coated on the anode catalyst sublayer made from the catalyst ink 2 and dried in an oven at 80° C. for ten minutes to form an anode catalyst sublayer made from the catalyst ink 1. In this way, an anode transfer sheet was obtained. At this point, the amount of the coated catalyst ink 1 was equal to that of the coated catalyst ink 2.

<Transfer Sheet for Cathode Catalyst Layer>

The catalyst ink 1 was coated on a PTFE sheet as a substrate and dried in an oven at 80° C. for ten minutes to form a cathode catalyst sublayer made from the catalyst ink 1. After the drying, the catalyst ink 2 was coated on the cathode catalyst sublayer made from the catalyst ink 1 and dried in an oven at 80° C. for ten minutes to form a cathode catalyst sublayer made from the catalyst ink 2. In this way, a cathode transfer sheet was obtained. At this point, the amount of the coated catalyst ink 2 was equal to that of the coated catalyst ink 1.

<<Production of MEA>>

The transfer sheet for the anode catalyst layer and the transfer sheet for the cathode catalyst layer were stamped out in square shapes, arranged facing both surfaces of a polymer electrolyte membrane (NAFION® 212, made by DuPont) and hot-pressed at 130° C. for ten minutes. The pressing pressures on the transfer sheets were adjusted to 3.0 MPa. After the hot-press, the resultant stacked product was cooled and PTFE as the substrate was peeled off the stacked product to obtain an MEA.

Comparative Example

<<Preparation of Catalyst Ink>>

<Catalyst Ink 3>

A platinum loaded carbon catalyst (carrier: Ketjen) having 50% by weight of platinum and 20% by weight of polymer electrolyte solution (NAFION®, made by DuPont) were mixed in a solvent mixture of water and ethanol. Then a dispersion treatment by a planetary ball mill was performed to obtain a catalyst ink 3. The relative composition ratio of platinum loaded carbon and polymer electrolyte was 2:1 by weight.

<<Production of transfer sheet>>

The catalyst ink 3 was coated on a PTFE sheet as a substrate and dried in an oven at 80° C. for ten minutes. The resultant product was used as the transfer sheet for the anode catalyst layer and the transfer sheet for the cathode catalyst layer. At this point, the amount of the coated catalyst ink 3 was equal to a sum of that of the coated catalyst ink 1 and the coated catalyst ink 2 in the Example described above.

<<Production of MEA>>

An MEA was manufactured in a similar way to the Example described above.

[Evaluation of Power Generation Performance]

Carbon cloths as gas diffusion layers were stuck to the MEAs in the Example and Comparative example in such a way that the MEA was interposed between two carbon cloths. Then, the MEAs were arranged in a power generation evaluation cell and a current-voltage relation was measured using fuel cell measurement equipment at a cell temperature of 80° C. under the following conditions: hydrogen was used as a fuel gas and air was used as the oxidant gas, back pressure was 100 kPa, and the humidification condition was 25% RH on the anode electrode and 25% RH on the cathode electrode.

[Measurement Result]

Electromotive forces of the MEAs manufactured in the Example and Comparative example corresponding to each current density is shown in Table 1. The MEA manufactured in the Example had better power generation performances than the MEA manufactured in the Comparative example both in a low load region and a high load region. Since the MEA manufactured in the Example had a better performance in a low load region (current density 0.2 A/cm$^2$), it is concluded that a decrease in battery performance by a proton transfer in the catalyst layer was smaller in the MEA manufactured in the Example than the MEA manufactured in the Comparative example. In addition, since the MEA manufactured in the Example had a better performance in a high load region (current density 1.0 A/cm$^2$), it is concluded that a decrease in battery performance caused by a flooding phenomenon in the catalyst layer was also smaller in the MEA manufactured in the Example than the MEA manufactured in the Comparative example.

TABLE 1

|  | Voltage at a current density of 0.2 A/cm$^2$ | Voltage at a current density of 1.0 A/cm$^2$ |
| --- | --- | --- |
| Example | 0.75 V | 0.61 V |
| Comparative example | 0.69 V | 0.58 V |

What is claimed is:

1. An MEA comprising:
a polymer electrolyte membrane;
a cathode catalyst layer; and
an anode catalyst layer, wherein
said cathode catalyst layer has two layers and is arranged on one surface of said polymer electrolyte membrane, wherein
said anode catalyst layer has two layers and is arranged on the other surface of said polymer electrolyte membrane, wherein
each of said layers of said cathode catalyst layer and said anode catalyst layer contains catalyst loaded particles and a polymer electrolyte, wherein
said two layers of said cathode catalyst layer have an identical weight ratio between said catalyst loaded particles and said polymer electrolyte, wherein
said two layers of said anode catalyst layer have an identical weight ratio between said catalyst loaded particles and said polymer electrolyte, wherein
a unit amount of said catalyst loaded particles contained in the one of said two layers of said cathode catalyst layer which is on a side of the surface are loaded with a greater amount of catalyst than a unit amount of said catalyst loaded particles contained in the other one of said two layers of said cathode catalyst layer which is on a side of the boundary with said polymer electrolyte membrane, and wherein
a unit amount of said catalyst loaded particles contained in the one of said two layers of said anode catalyst layer which is on a side of the boundary with said polymer electrolyte membrane are loaded with a greater amount of catalyst than a unit amount of said catalyst loaded particles contained in the other one of said two layers of said anode catalyst layer which is on a side of the surface.

2. The MEA according to claim 1, wherein said polymer electrolyte is proton conductive.

3. The MEA according to claim 2, wherein both of said two layers of said cathode catalyst layer have an identical weight, and wherein
both of said two layers of said anode catalyst layer have an identical weight.

4. The MEA according to claim 3, wherein
said unit amount of said catalyst loaded particles contained in the one of said two layers of said cathode catalyst layer which is on the side of the surface are loaded with a catalyst by a weight ratio of 70% with respect to 100% of said catalyst loaded particles, wherein
said unit amount of said catalyst loaded particles contained in the other one of said two layers of said cathode catalyst layer which is on the side of the boundary with said polymer electrolyte membrane are loaded with a catalyst by a weight ratio of 30% with respect to 100% of said catalyst loaded particles, wherein
said unit amount of said catalyst loaded particles contained in the one of said two layers of said anode catalyst layer which is on the side of the boundary with said polymer electrolyte membrane are loaded with a catalyst by a weight ratio of 70% with respect to 100% of said catalyst loaded particles, and wherein
said unit amount of said catalyst loaded particles contained in the other one of said two layers of said cathode catalyst layer which is on the side of the surface are loaded with a catalyst by a weight ratio of 30% with respect to 100% of said catalyst loaded particles.

5. A fuel cell comprising:
said MEA according to claim 4;
a pair of gas diffusion layers; and
a pair of separators, said MEA being interposed between said pair of gas diffusion layers, and said MEA interposed between said pair of gas diffusion layers being further interposed between said pair of separators.

* * * * *